United States Patent
Karasawa et al.

(10) Patent No.: US 12,537,465 B2
(45) Date of Patent: Jan. 27, 2026

(54) MOTOR CONTROL APPARATUS AND MOTOR CONTROL METHOD

(71) Applicant: SUBARU CORPORATION, Tokyo (JP)

(72) Inventors: Yukio Karasawa, Tokyo (JP); Shogo Oki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1380 days.

(21) Appl. No.: 16/589,617

(22) Filed: Oct. 1, 2019

(65) Prior Publication Data

US 2020/0136537 A1 Apr. 30, 2020

(30) Foreign Application Priority Data

Oct. 24, 2018 (JP) ................................ 2018-200343

(51) Int. Cl.
*H02P 6/16* (2016.01)
*H02K 7/00* (2006.01)
(Continued)

(52) U.S. Cl.
CPC ............... *H02P 6/16* (2013.01); *H02K 7/006* (2013.01); *H02K 11/27* (2016.01); *H02P 5/50* (2013.01);
(Continued)

(58) Field of Classification Search
CPC .......... H02P 6/16; H02P 29/40; H02K 11/27; H02K 7/006
See application file for complete search history.

(56) References Cited

U.S. PATENT DOCUMENTS

2002/0152039 A1* 10/2002 Fujimoto .................. H02P 6/16
702/36
2003/0102861 A1  6/2003 Kushihara
(Continued)

FOREIGN PATENT DOCUMENTS

CN         101582677 A      11/2009
CN         106464185 A       2/2017
(Continued)

OTHER PUBLICATIONS

Japanese Office Action dated Sep. 6, 2022, in corresponding Japanese Patent Application No. 2018-200343, with an English translation thereof.
(Continued)

*Primary Examiner* — Kawing Chan
(74) *Attorney, Agent, or Firm* — MCGINN I.P. LAW GROUP, PLLC (57) ABSTRACT

A motor control apparatus includes first and second detectors, and a switcher. The first detector detects a rotation position of a rotor using a signal from a resolver, and allows resolution of the rotation position to become lower in a region where a rotation speed of the rotor is higher than a first predetermined value, than in a region where the rotation speed is equal to or lower than the first predetermined value. The second detector estimates the rotation position using a current of the motor. The switcher switches between a first control and a second control in the region where the rotation speed is equal to or lower than the first predetermined value. The first control includes controlling the motor using the rotation position detected by the first detector. The second control includes controlling the motor using the rotation position estimated by the second detector.

11 Claims, 5 Drawing Sheets

(51) Int. Cl.
  *H02K 11/27*   (2016.01)
  *H02P 5/50*    (2016.01)
  *H02P 6/17*    (2016.01)
  *H02P 21/18*   (2016.01)
  *H02P 29/40*   (2016.01)

(52) U.S. Cl.
  CPC ............. *H02P 6/17* (2016.02); *H02P 21/18* (2016.02); *H02P 29/40* (2016.02); *H02P 2203/05* (2013.01)

(56) References Cited

U.S. PATENT DOCUMENTS

| | | | | |
|---|---|---|---|---|
| 2010/0148763 A1* | 6/2010 | Park | .................. | G01D 3/032 324/207.25 |
| 2012/0098476 A1* | 4/2012 | Chiu | .................. | G05B 19/39 318/639 |
| 2016/0329849 A1 | 11/2016 | Nakajima et al. | | |
| 2018/0201303 A1* | 7/2018 | Hara | .................. | B62D 15/0235 |
| 2018/0290664 A1 | 10/2018 | Suzuki et al. | | |
| 2019/0323469 A1* | 10/2019 | Hao | .................. | H02P 6/182 |
| 2019/0348938 A1* | 11/2019 | Takahashi | .............. | H02P 29/40 |

FOREIGN PATENT DOCUMENTS

| | | | |
|---|---|---|---|
| CN | 108136933 A | | 6/2018 |
| JP | 2003-164187 A | | 6/2003 |
| JP | 2005-102451 A | | 4/2005 |
| JP | 2006325305 A | * | 11/2006 |
| JP | 2007-124857 A | | 5/2007 |
| JP | 2010-063218 A | | 3/2010 |
| JP | 2010-172136 A | | 8/2010 |
| JP | 2015-194007 A | | 11/2015 |

OTHER PUBLICATIONS

Japanese Office Action, dated Jul. 4, 2023, in Japanese Application No. 2018-200343 and English Translation thereof.
Chinese Office Action in Application No. 201910948815.5 issued on Jul. 24, 2024 with English translation thereof.

* cited by examiner

MOTOR CONTROL APPARATUS AND MOTOR CONTROL METHOD

CROSS-REFERENCE TO RELATED APPLICATIONS

This application claims priority from Japanese Patent Application No. 2018-200343 filed on Oct. 24, 2018, the entire contents of which are hereby incorporated by reference.

BACKGROUND

The technology relates to a motor control apparatus and a motor control method.

SUMMARY

An aspect of the technology provides a motor control apparatus that controls a motor including a rotor and a resolver. The motor control apparatus includes a first detector, a second detector, and a switcher. The first detector is configured to detect a rotation position of the rotor using a signal from the resolver. The first detector allows resolution of the rotation position to become lower in a region in which a rotation speed of the rotor is higher than a first predetermined value, than in a region in which the rotation speed is equal to or lower than the first predetermined value. The second detector is configured to estimate the rotation position of the rotor using a current of the motor without using the signal from the resolver. The switcher is configured to switch between a first control and a second control in the region in which the rotation speed is equal to or lower than the first predetermined value. The first control includes controlling the motor using the rotation position detected by the first detector. The second control includes controlling the motor using the rotation position estimated by the second detector.

An aspect of the technology provides a motor control apparatus that controls a motor. The motor drives a vehicle and includes a resolver. The motor control apparatus includes a first detector, a second detector, and a switcher. The first detector is configured to detect a rotation position of a rotor of the motor using a signal from the resolver. The second detector is configured to estimate the rotation position of the rotor using a current of the motor without using the signal from the resolver. The switcher is configured to execute a first control while inhibiting a second control on the condition that an amount of change per time in a driving force of the vehicle or an amount of change per time in a vehicle speed, or an amount of change per time in a parameter related to the driving force of the vehicle or an amount of change per time in a parameter related to the vehicle speed is equal to or greater than a threshold. The first control includes controlling the motor using the rotation position detected by the first detector. The second control includes controlling the motor using the rotation position estimated by the second detector.

An aspect of the technology provides a motor control method of controlling a motor including a rotor and a resolver. The motor control method includes switching between a first control and a second control in a region in which a rotation speed of the rotor is equal to or lower than a predetermined value. The first control includes controlling the motor using a rotation position of the rotor detected by a detection method. The detection method includes detecting the rotation position using a signal from the resolver. The detection method includes allowing resolution of the rotation position to become lower in a region in which the rotation speed of the rotor is higher than the predetermined value, than in a region in which the rotation speed is equal to or lower than the predetermined value. The second control includes controlling the motor using the rotation position estimated using a current of the motor without using the signal from the resolver.

An aspect of the technology provides a motor control apparatus that controls a motor including a rotor and a resolver. The motor control apparatus includes a first detector and circuitry. The first detector is configured to detect a rotation position of the rotor using a signal from the resolver. The first detector allows resolution of the rotation position to become lower in a region in which a rotation speed of the rotor is higher than a first predetermined value, than in a region in which the rotation speed is equal to or lower than the first predetermined value. The circuitry is configured to estimate the rotation position of the rotor using a current of the motor without using the signal from the resolver. The circuitry is configured to switch between a first control and a second control in the region in which the rotation speed is equal to or lower than the first predetermined value. The first control includes controlling the motor using the rotation position detected by the first detector. The second control includes controlling the motor using the rotation position estimated by the circuitry.

An aspect of the technology provides a motor control apparatus that controls a motor. The motor drives a vehicle and includes a resolver. The motor control apparatus includes a first detector and circuitry. The first detector is configured to detect a rotation position of a rotor of the motor using a signal from the resolver. The circuitry is configured to estimate the rotation position of the rotor using a current of the motor without using the signal from the resolver. The circuitry is configured to execute a first control while inhibiting a second control on the condition that an amount of change per time in a driving force of the vehicle or an amount of change per time in a vehicle speed, or an amount of change per time in a parameter related to the driving force of the vehicle or an amount of change per time in a parameter related to the vehicle speed is equal to or greater than a threshold. The first control includes controlling the motor using the rotation position detected by the first detector. The second control includes controlling the motor using the rotation position estimated by the circuitry.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

There have been known motor control apparatuses including a detector that detects a rotation position of a motor. For example, Japanese Unexamined Patent Application Publication (JP-A) No. 2003-164187 describes a control apparatus including an R/D converter that converts an angle signal detected by a resolver into a digital signal. The control apparatus is able to estimate a rotation angle of a motor on the basis of a back electromotive voltage detected from the motor.

The control apparatus described in JP-A No. 2003-164187 is configured to detect the rotation angle using the R/D converter in a normal state, and to detect the rotation angle on the basis of the back electromotive voltage at the time of a failure. This hinders a motor control in the normal state by utilizing characteristics of both detections. Accordingly, there is room for improving control accuracy or responsiveness.

It is desirable to provide a new and improved motor control apparatus and motor control method that make it possible to improve control accuracy or responsiveness, or both.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same numerals to avoid redundant description, and elements not in direct relation to the technology may not be illustrated.

First Embodiment

[Configuration]

Figure 1:
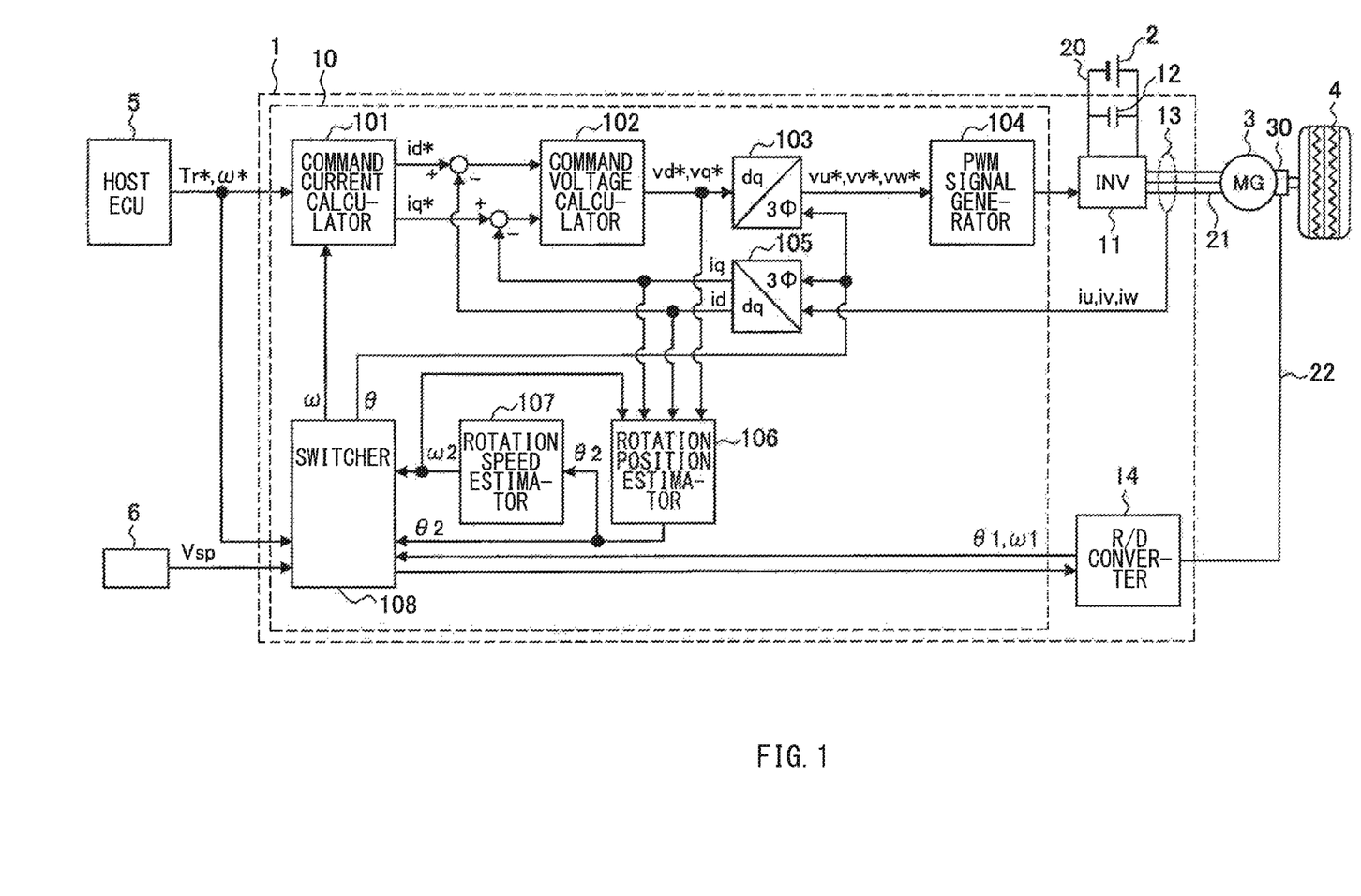
FIG. 1 is a block diagram illustrating an example of a motor control apparatus according to a first embodiment of the technology.

Described first is an example of a configuration of a motor control apparatus according to a first embodiment of the technology. The motor control apparatus according to this embodiment may be applied to a control system of a motor, i.e., a rotating electric machine, to be mounted on a motor-driven vehicle. FIG. 1 is a block diagram illustrating an example of an electrical configuration of the control system. The motor-driven vehicle may be an electric vehicle or a hybrid electric vehicle. Further, the motor-driven vehicle is not limited to an automobile, and may be a vehicle such as a railway.

A motor 3 may include a motor generator that not only serves as a driving force source generating a driving force of a vehicle but also serves as a generator. The motor 3 may include a rotary shaft coupled to a drive wheel 4 of the vehicle. It is to be noted that the rotary shaft of the motor 3 may be coupled to a shifting machine or (a crankshaft of) an internal combustion engine. The motor 3 may include a three-phase brushless motor. In one specific but non-limiting example, the motor 3 may include a permanent magnet type synchronous motor. The motor 3 may include a rotor (a rotating element) and a stator (a fixed element). The rotor of the motor 3 may serve as a field. The stator may include three-phase (U-phase, V-phase, and W-phase) windings. The motor 3 may be of an inner rotor type or an outer rotor type. Moreover, permanent magnets may be on a surface of the rotor, or alternatively, the permanent magnets may be inside the rotor. A power supply 2 of the motor 3 may include an on-vehicle DC (direct current) voltage supply.

The control system may include a resolver 30 and a motor ECU (Electronic Control Unit) 1. The resolver 30 may detect a rotation position (rotation angle) θ and a rotation speed (rotation angular speed) ω of the rotor. The resolver 30 may include, for example, an input side winding and two output side windings. An AC signal (voltage) may be applied to the input side winding. This causes the input side winding to be excited, resulting in generation of an induced electromotive force in both the output side windings. Thus, each of the output side windings outputs an AC signal (voltage). Phases of the output signals of both the output side windings are different from each other. An amplitude of the output signal of each of the output side windings changes in accordance with the rotation position θ of the rotor. It is to be noted that the resolver 30 is not limited to those of an amplitude modulation method but may be of a phase modulation method.

The motor ECU 1 may include an electronic control unit that serves as a control device of the motor 3. The motor ECU 1 may include a power control unit in which an inverter 11, a current sensor 13, and an R/D (Resolver-Digital) converter 14 are mounted on one board together with a microcomputer 10. The inverter 11 may serve as a power conversion circuit. The R/D converter 14 may serve as an analog-to-digital conversion circuit. The microcomputer 10 may serve as a digital circuit. In this case, the motor ECU 1 may be covered with a shield in order to suppress influence of an external electromagnetic noise. It is to be noted that the inverter 11, without limitation, may be separate from the motor ECU 1, i.e., the microcomputer 10.

The inverter 11 may include a three-phase bridging circuit including six switching elements such as IGBTs (insulated gate bipolar transistors). The inverter 11 may be coupled to the power supply 2 by a power supply line 20, and be coupled to the motor 3 by an electric wire 21. A capacitor 12 may be provided in parallel with power supply 2 in order to control fluctuations in a DC voltage between the power supply 2 and the inverter 11. It is to be noted that the power supply 2 is not limited to a DC power supply but may include an AC power supply and a rectifying circuit. The current sensor 13 may include detectors that detect respective three-phase currents iu, iv, and iw flowing through the windings of the stator.

The R/D converter 14 may be coupled to the output side windings of the resolver 30 through a signal line 22. The R/D converter 14 may convert the analog signals inputted from the resolver 30, i.e., the output signals of the output side windings, into digital signals, and output the digital signals as a detection value of the rotation position θ of the rotor (a detected rotation position θ1) and a detection value of the rotation speed ω of the rotor (a detected rotation speed ω1). For example, the R/D converter 14 may calculate the detected rotation speed ω1 on the basis of cycles on which amplitude of the output signals of the output side windings change. The R/D converter 14 may calculate the detected rotation position θ1 by a combination of the output signals of both the output side windings.

In one embodiment of the technology, the R/D converter 14 may serve as a "first detector" configured to detect a rotation position of a rotor using a signal from a resolver.

Figure 2:
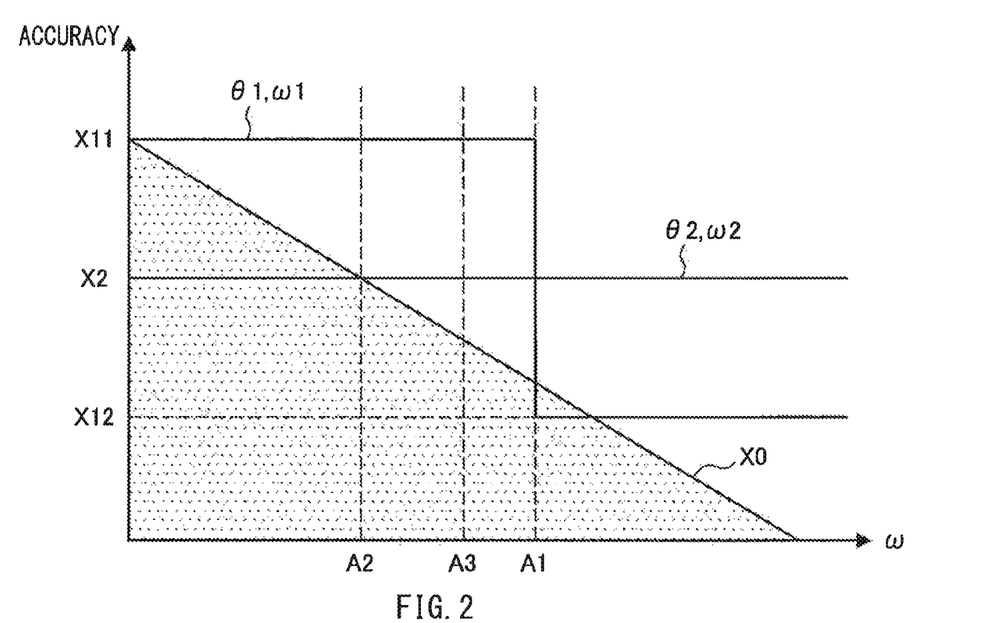
FIG. 2 is a graph illustrating relation of a rotation speed of a motor according to the first embodiment, to detection accuracy with the use of a resolver and estimation accuracy with the use of a current.

Resolution of the rotation position θ by the R/D converter 14 is lower in a region where the rotation speed ω (or a rotational acceleration rate) of the rotor is higher than a first predetermined value A1, than in a region where the rotation speed ω is equal to or lower than the first predetermined value A1. That is, there is a range of the rotation speed ω in which the R/D converter 14 is able to detect the rotation position θ with predetermined resolution following rotation of the rotor, and an upper limit of the range (maximum speed) may serve as the first predetermined value A1. Accordingly, as illustrated by way of example in FIG. 2, detection accuracy X11 of the detected rotation position θ1 and the detected rotation speed ω1 using the resolver 30 in the region where the rotation speed ω is equal to or lower than the first predetermined value A1 is higher than detection accuracy X12 in the region where the rotation speed ω is higher than the first predetermined value A1. In general, in a case where the rotation speed ω is low, accuracy X0 of the rotation position θ or the rotation speed ω requested for a motor control (hereinbelow also referred to as requested accuracy X0) is higher than that in a case where the rotation speed ω is high. In FIG. 2, a region that does not satisfy the requested accuracy X0 is indicated by a shaded region. As illustrated in FIG. 2, in the region where the rotation speed ω is equal to or lower than the first predetermined value A1, the detection accuracy X11 using the resolver 30 may be equal to or greater than the requested accuracy X0.

Moreover, the R/D converter 14 is configured to be able to determine whether or not the output signals of the output side windings contain a noise. That is, a noise may be generated in a case where a leakage magnetic flux or other magnetic flux of the motor 3 passes through the windings of the resolver 30 or the signal line 22. In this case, there is possibility of deformation of waveforms themselves of the output signals of the output side windings. In addition, a noise may be generated in a case where, for example, the signal line 22 carries a spike caused by the inverter 11 as a PWM driving circuit. In this case, a spike-like noise is superimposed on the output waveforms of the output side windings. For example, the R/D converter 14 may determine that noise superimposition occurs in a case where the output signals become greater than or become lower than a predetermined threshold value, with amplitude centers and maximum amplitudes of the output signals of the output side windings falling within a normal range. It is to be noted that the R/D converter 14 may be configured to be able to detect, for example, a functional abnormality of the R/D converter 14 itself, or a disconnection of the signal line 22 coupled to the resolver 30.

The motor ECU 1 (microcomputer 10) may be coupled to a host ECU 5 and various sensors mounted on the vehicle via a CAN (Controller Area Network) or a signal line. These sensors may include, for example but not limited to, the resolver 30 and a vehicle speed sensor 6. The motor ECU 1 may generate a signal that operates the inverter 11 (the switching elements) and output the signal, on the basis of signals inputted from the sensors as mentioned above, in order to realize a command torque Tr* or a command rotation speed ω* of the motor 3 inputted from the host ECU 5. By controlling the motor 3 in this way, the motor ECU 1 realizes an appropriate driving force in accordance with a traveling state of the vehicle. It is to be noted that the motor ECU 1 may receive the signals from, for example, the vehicle speed sensor 6, (indirectly) through the host ECU 5.

The microcomputer 10 may include a central processing unit (CPU), a read-only memory (ROM), a random access memory (RAM), and an input/output interface (I/O). The CPU may execute various calculation processing. The ROM may hold various control programs. The RAM may be used as a work area for data storage and program execution. The microcomputer 10 may have a general configuration in which the CPU, the ROM, the RAM, and the I/O are coupled to one another through a bidirectional common bus. The microcomputer 10 may serve as a plurality of processors by executing a predetermined program. The plurality of processors may include a command current calculator 101, a command voltage calculator 102, coordinate converters 103 and 105, a PWM signal generator 104, a rotation position estimator 106, a rotation speed estimator 107, and a switcher 108. The term such as "calculation" to be carried out by the calculators as mentioned above may mean overall processing on software, and each of the plurality of the processors may be realized by software. It is to be noted that each of the plurality of the processor may be realized by an electronic circuit.

The command current calculator 101 may calculate command currents on a dq coordinate system (d-axis command current id* and q-axis command current iq*), on the basis of the command torque Tr* or on the basis of the command rotation speed ω* and the rotation speed ω (inputted from the switcher 108). The dq coordinate system is an orthogonal coordinate system that rotates in synchronization with the rotor (permanent magnets). The d-axis command current id* is a command value of a d-axis current component along a magnetic pole direction of the rotor. The q-axis command current iq* is a command value of a q-axis current component orthogonal to the d-axis. The command current calculator 101 may calculate the d-axis command current id* and the q-axis command current iq* by an arithmetic expression or may set them using a map. In this map, for example, the d-axis command current id* and the q-axis command current iq* corresponding to the command torque Tr* or a rotation speed deviation (ω*−ω) may be set in advance by, for example, experiments.

The command voltage calculator 102 may calculate command voltages on the dq coordinate system (d-axis command voltage vd* and q-axis command voltage vq*). For example, the d-axis command voltage vd* and the q-axis command voltage vq* may be calculated by integrating a deviation between the command currents id* and iq* (inputted from the command current calculator 101) and actual currents id and iq (inputted from the coordinate converter 105) and multiplying the resultant value by a predetermined gain.

The coordinate converter 103 may carry out calculation to convert the command voltages vd* and vq* (inputted from the command voltage calculator 102) into command voltages on a three-phase coordinate system fixed to the stator (three-phase command voltages, i.e., a u-phase command voltage vu*, a v-phase command voltage vv*, and a w-phase command voltage vw*), with the use of the rotation position θ of the rotor (inputted from the switcher 108). The command voltages vu*, vv*, and vw* are command voltages of respective phases that are directed to a control of the inverter 11.

The PWM (Pulse Width Modulation) signal generator 104 may generate an on/off signal (operating signal) on the basis of the three-phase command voltages vu*, vv*, and vw* (inputted from the coordinate converter 103), and output the resultant signal to the inverter 11. This causes voltage application to the respective phases of the motor 3 at duty ratios corresponding to the command voltages vu*, vv*, vw* of the respective phases. The inverter 11 may drive the motor 3 by supplying a three-phase current (sine wave).

The coordinate converter 105 may carry out calculation to convert the three-phase actual currents iu, iv, and iw (inputted from the current sensor 13) into actual currents on the dq coordinate system (d-axis actual current id and q-axis actual current iq), with the use of the rotation position θ of the rotor (inputted from the switcher 108).

The rotation position estimator 106 may calculate an estimated value (estimated rotation position) θ2 of the rotation position θ, using a predetermined model of the motor 3, on the basis of the dq-axis command voltages vd* and vq*, the dq-axis actual currents id and iq, and a rotation speed ω2 of the rotor (inputted from the rotation speed estimator 107). In one specific but non-limiting example, an induced voltage generated by the permanent magnets of the rotor may be calculated in a form of a vector by subtracting, from the command voltages vd* and vq*, a voltage drop (calculated by the command currents id and iq, and the rotation speed ω2) caused by winding resistance of the stator and dq-axis inductance. The estimated rotation position θ2 may be calculated from a phase of the vector (extended induced voltage). In this calculation, used may be values obtained by removing, by a low-pass filter, respective high-frequency components of the command voltages vd* and vq*, and the actual currents id and iq inputted. Moreover, a value obtained by removing, by a low-pass filter, a high-frequency component of the estimated rotation position θ2 calculated as described above may serve as the final estimated rotation position θ2.

In one embodiment of the technology, the rotation position estimator 106 may serve as a "second detector" configured to estimate the rotation position of the rotor using a current of a motor without using the signal from the resolver.

The rotation speed estimator 107 may calculate an estimated value (estimated rotation speed) ω2 of the rotation speed ω using the estimated rotation position θ2 (inputted from the rotation position estimator 106). For example, the rotation speed estimator 107 may be able to calculate the estimated rotation speed ω2 by differentiating the estimated rotation position θ2 inputted in or before previous processing and removing a high-frequency component thereof by a low-pass filter.

As illustrated in FIG. 2, estimation accuracy X2 of the estimated rotation position θ2 and the estimated rotation speed ω2 using the currents may be lower than the detection accuracy X11 using the resolver 30 in the region where the rotation speed ω of the rotor is equal to or lower than the first predetermined value A1. Meanwhile, the estimation accuracy X2 may be higher than the detection accuracy X12 in the region where the rotation speed ω is higher than the first predetermined value A1. Generally, the requested accuracy X0 is higher in the case where the rotation speed ω is low, than in the case where the rotation speed ω is high. Accordingly, in the case where the rotation speed ω is equal to or lower than the first predetermined value A1, the estimation accuracy X2 using the currents may be equal to or higher than the required accuracy X0 in a region where the rotation speed ω is equal to or higher than a second predetermined value A2, while the estimation accuracy X2 may be lower than the requested accuracy X0 in a region where the rotation speed ω is lower than the second predetermined value A2. The second predetermined value A2 is smaller than the first predetermined value A1 (A2<A1). In other words, there is a range of the rotation speed ω in which the rotation position estimator 106 is able to provide the predetermined requested accuracy X0, and a lower limit of the range (minimum speed) may serve as the second predetermined value A2. As described above, the rotation position estimator 106 may calculate the estimated rotation position θ2 using the induced electromotive force (induced voltage) caused by the rotation of the rotor. However, the lower the rotation speed ω of the rotor, the smaller the induced voltage. This causes the estimated rotation position θ2 to deviate from the actual rotation position θ. In other words, there arises possibility of deterioration in the estimation accuracy X2. This also causes higher possibility that the estimation accuracy X2 becomes lower than the requested accuracy X0 in the region where the rotation speed ω is lower than the second predetermined value A2.

The switcher 108 may be able to receive the command torque Tr* or the command rotation speed ω* of the motor 3 from the host ECU 5, and be able to receive a signal indicating that a vehicle control such as, but not limited to, a cruise control is being executed. The switcher 108 may switch between the detected rotation position θ1 and the estimated rotation position θ2, on the basis of, for example but not limited to, a signal from the host ECU 5, a signal from the R/D converter 14 (noise-related data), the rotation speeds ω1 and ω2, and a signal of a vehicle speed Vsp. The switcher 108 may set either the detected rotation position θ1 or the estimated rotation position θ2 as the final rotation position θ, to output the resultant rotation position θ. Moreover, the switcher 108 may switch between the detected rotation speed ω1 and the estimated rotation speed ω2. The switcher 108 may set either the detected rotation speed ω1 or the estimated rotation speed ω2 as the final rotation speed ω, to output the resultant rotation position ω.

In a case with a noise included in the output signals of the resolver 30 inputted to the R/D converter 14, the switcher 108 may be able to determine, on the basis of a signal from the R/D converter 14, magnitude of influence of the noise, i.e., a degree of noise influence, on accuracy or reliability of the detection of the detected rotation position θ1 and the detected rotation speed ω1 by the R/D converter 14. For example, in a case where the number of occurrences of the noise within a predetermined period of time is equal to or greater than a predetermined number of times, the switcher 108 may be able to determine that the degree of the noise influence is great. Alternatively, the switcher 108 may numeralize a degree of deformation of a signal waveform caused by the noise, and determine that the degree of the noise influence is great in a case where the numeralized value is equal to or greater than a predetermined threshold. In this way, the magnitude of the influence exerted by the noise may be determined by numeralizing the degree of the noise influence by a predetermined parameter such as, but not limited to, the number of times of the occurrence of the noise or the degree of the deformation of the waveform, and comparing the resultant value with the predetermined threshold.

Figure 3:
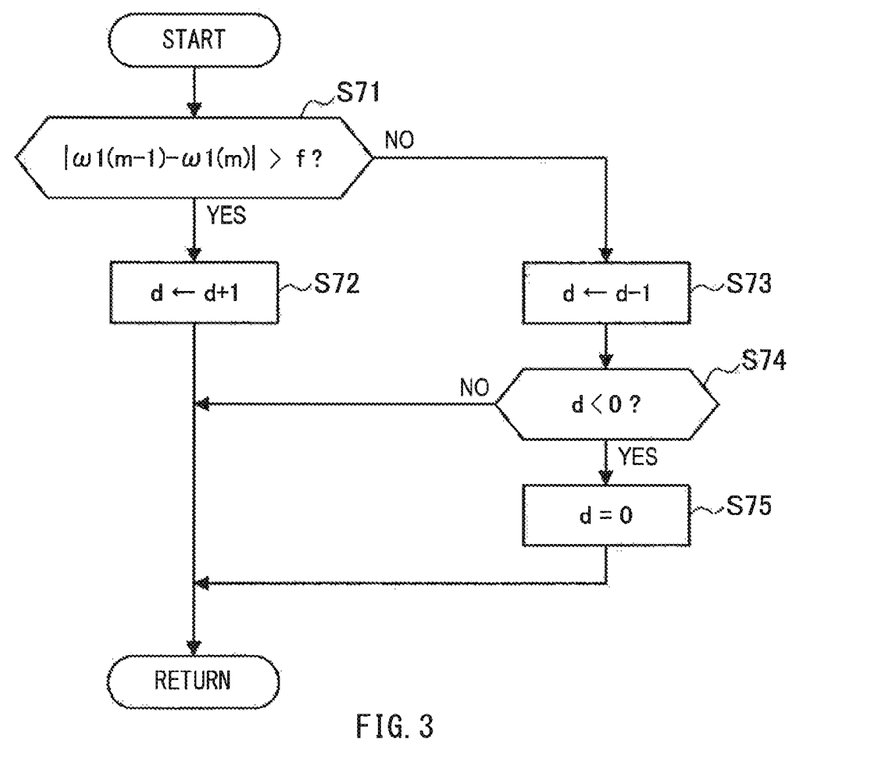
FIG. 3 is a flowchart of calculation processing of a degree of noise influence, by the motor control apparatus according to the first embodiment.

FIG. 3 illustrates an example of a procedure for the switcher 108 to calculate the degree of the noise influence. The flow of this processing may be repeatedly executed on predetermined cycles. In step S71, the switcher 108 may calculate magnitude of a difference between the rotation speed $\omega1(m-1)$ detected on a previous cycle and the rotation speed $\omega1(m)$ detected on a current cycle, and determine whether or not the magnitude of the difference is greater than a predetermined threshold f of determination of noise occurrence. In a case where the magnitude of the difference is greater than the threshold f of the determination of the noise occurrence (YES in step S71), the process may proceed to step S72. In a case where the magnitude of the difference is equal to or smaller than the threshold f of the determination of the noise occurrence (NO in step S71), the process may proceed to step S73. In step S72, the switcher 108 may add 1 to the degree of the noise influence d, and terminate the current cycle. In step S73, the switcher 108 may subtract 1 from the degree of the noise influence d, and proceed to step S74. In step S74, the switcher 108 may determine whether or not the degree of the noise influence d is a negative value. In a case where the degree of the noise influence d is a negative value (YES in step S74), the process may proceed to step S75. In a case where the degree of the noise influence d is equal to or greater than zero (0), the current cycle may be terminated. In step S75, the degree of the noise influence d may be set to 0. That is, in the procedure illustrated in FIG. 3, the degree of the noise influence d may be calculated as a value that increases in accordance with the number of times where the determination is made that the noise has occurred (steps S71→S72). In addition, the degree of the noise influence d may be calculated as a value that decreases in accordance with the number of times where the determination is made that the noise has not occurred (steps S71→S73). A lower limit of the degree of the noise influence d may be zero (0) (steps S74→S75). It is to be noted that a detection value to be used in the calculation of the degree of the noise influence d is not limited to the detected rotation speed $\psi1$. The detection value to be used in the calculation of the degree of the noise influence d may be, for example, the detected rotation position $\theta1$.

Figure 4:
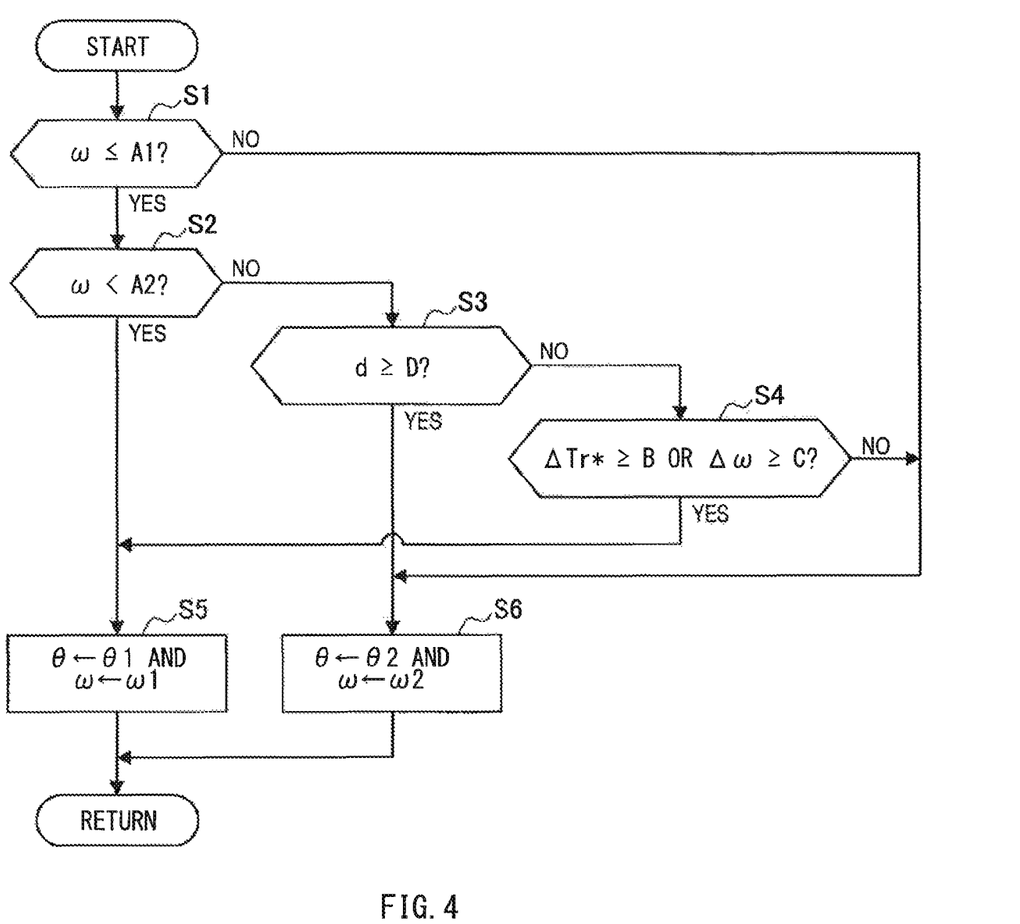
FIG. 4 is a flowchart of switching processing by the motor control apparatus according to the first embodiment.

FIG. 4 illustrates an example of a flow of main processing to be executed by the switcher 108. The flow of this processing may be repeatedly executed on predetermined cycles. In step S1, a determination may be made as to whether or not the rotation speed $\omega$ outputted on the previous cycle is equal to or lower than the first predetermined value A1. In a case where the rotation speed $\omega$ is equal to or lower than the first predetermined value A1 (YES in step S1), the process may proceed to step S2. In a case where the rotation speed $\omega$ is higher than the first predetermined value A1 (NO in step S1), the process may proceed to step S6. It is to be noted that instead of the rotation speed $\omega$, the command rotation speed $\omega^*$ may be used. In step S2, a determination may be made as to whether or not the rotation speed $\omega$ outputted on the previous cycle is lower than the second predetermined value A2. In a case where the rotation speed $\omega$ is lower than the second predetermined value A2 (YES in step S2), the process may proceed to step S5. In a case where the rotation speed $\omega$ is equal to or greater than the second predetermined value A2 (NO in step S2), the process may proceed to step S3. It is to be noted that in place of the rotation speed $\omega$, the command rotation speed $\omega^*$ may be used.

In step S3, a determination may be made as to whether or not the degree of the noise influence d in the output signals of the resolver 30 is equal to or greater than a threshold D.

As the degree of the noise influence d, a value calculated according to the procedure illustrated in FIG. 3 may be used, but this is non-limiting. In a case where the degree of the noise influence d is equal to or greater than the threshold D (YES in step S3), the process may proceed to step S6. In a case where the degree of the noise influence d is smaller than the threshold D (NO in step S3), the process may proceed to step S4. In step S4, a determination may be made as to whether or not an amount of change per time $\Delta Tr^*$ in the command torque $Tr^*$ of the motor 3 inputted from the host ECU 5 (e.g., a difference of the command torque $Tr^*$ between the cycles) is equal to or greater than a predetermined threshold B, or whether or not an amount of change per time $\Delta\omega$ in the rotation speed $\omega$ outputted on cycles up to the previous cycle is equal to or greater than a predetermined threshold C. In a case where the amount of change per time $\Delta Tr^*$ is equal to or greater than the threshold B, or in a case where the amount of change per time $\Delta\omega$ is equal to or greater than the threshold C (YES in step S4), the process may proceed to step S5. In a case where the amount of change per time $\Delta Tr^*$ is smaller than the threshold B and the amount of change per time $\Delta\omega$ is smaller than the threshold C (NO in step S4), the process may proceed to step S6.

In step S5, the detected rotation position $\theta1$ may be set as the rotation position $\theta$, while the detected rotation speed $\omega1$ may be set as the rotation speed $\omega$. These values may be outputted and the current cycle may be terminated. In step S6, the estimated rotation position $\theta2$ may be set as the rotation position $\theta$, while the estimated rotation speed $\omega2$ may be set as the rotation speed $\omega$. These values may be outputted and the current cycle may be terminated.

It is to be noted that the switcher 108 may execute step S4 after making the negative determination in step S2 and before proceeding to step S3. In this case, after the negative determination is made in step S4, the process may proceed to step S3.

The switcher 108 may switch a combination of values ($\theta$, $\omega$) of the rotation position $\theta$ and the rotation speed $\omega$ between ($\theta1$, $\omega1$) and ($\theta2$, $\omega$). At this occasion, the switcher 108 may gradually change the combination of the values from pre-switching values to post-switching values. For example, in switching from ($\theta1$, $\omega1$) to ($\theta2$, $\omega$), instead of immediately switching to ($\theta2$, $\omega$), the switcher 108 may change the combination of the values toward ($\theta2$, $\omega$), with time change rates ($\Delta\theta$, $\Delta\omega$) of the combination of the values ($\theta$, $\omega$) falling within predetermined ranges. For example, the switcher 108 may bring differences between the combinations of the values ($\theta$, $\omega$) outputted on the respective cycles, i.e., gradients of changes in the combination of the values ($\theta$, $\omega$), to predetermined constant values. It is to be noted that except at the time of the switching as mentioned above, the switcher 108 may output, to the R/D converter 14 or the rotation position estimator 106 (and the rotation speed estimator 107), a command to stop detection or estimation of whichever combination of ($\theta1$, $\omega$) and ($\theta2$, $\omega$) is not to be outputted.

Figure 5:
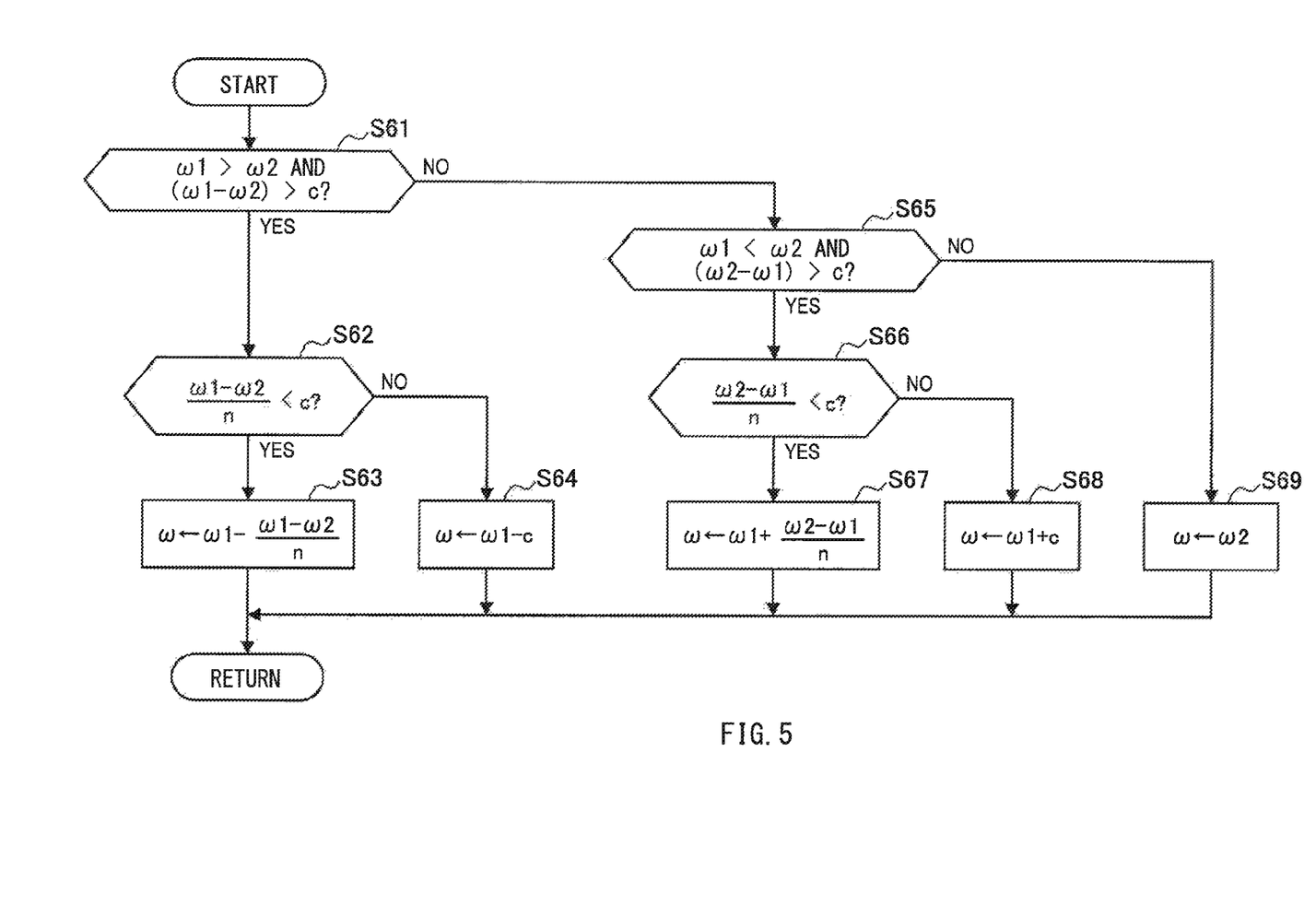
FIG. 5 is a flowchart of setting processing of a control rotation speed at the time of switching, by the motor control apparatus according to the first embodiment.

FIG. 5 illustrates an example of a procedure for the switcher 108 to switch the rotation speed $\omega$ from the detected rotation speed $\omega1$ to the estimated rotation speed $\omega2$ in step S6 of FIG. 4. The flow of this processing may be repeatedly executed on predetermined cycles. Hereinafter, the rotation speed $\omega$ at the time of the switching is referred to as a control rotation speed $\omega$. In step S61, a determination may be made as to whether or not the detected rotation speed $\omega1$ is greater than the estimated rotation speed $\omega2$, and whether or not a value ($\omega1-\omega2$) obtained by subtracting the estimated rotation speed $\omega2$ from the detected rotation speed $\omega 1$ is greater than a predetermined variation threshold c. In a case with an affirmative determination (YES in step S61), the process may proceed to step S62. In a case with a negative determination (NO in step S61), the process may proceed to step S65. In step S62, a determination may be made as to whether or not a value $(\omega 1-\omega 2)/n$ obtained by dividing the value $(\omega 1-\omega 2)$ by a predetermined number of times n is smaller than the variation threshold c. In a case where the value $(\omega 1-\omega 2)/n$ is smaller than the variation threshold c (YES in step S62), the process may proceed to step S63. In a case where the value $(\omega 1-\omega 2)/n$ is equal to or greater than the variation threshold c (NO in step S62), the process may proceed to step S64. In step S63, a value obtained by subtracting the value $(\omega 1-\omega 2)/n$ from the detected rotation speed $\omega 1$ may be set as the control rotation speed $\omega$. In step S64, a value obtained by subtracting the variation threshold c from the detected rotation speed $\omega 1$ may be set as the control rotation speed $\omega$.

In step S65, a determination may be made as to whether or not the detected rotation speed $\omega 1$ is smaller than the estimated rotation speed $\omega 2$, and whether or not a value $(\omega 2-\omega 1)$ obtained by subtracting the detected rotation speed $\omega 1$ from the estimated rotation speed $\omega 2$ is greater than the variation threshold c. In a case with an affirmative determination (YES in step S65), the process may proceed to step S66. In a case with a negative determination (NO in step S65), the process may proceed to step S69. In step S66, a determination may be made as to whether or not a value $(\omega 2-\omega 1)/n$ obtained by dividing the value $(\omega 2-\omega 1)$ by the number of times n is smaller than the variation threshold c. In a case where the value $(\omega 2-\omega 1)/n$ is smaller than the variation threshold c (YES in step S66), the process may proceed to step S67. In a case where the value $(\omega 2-\omega 1)/n$ is equal to or greater than the variation threshold c (NO in step S66), the process may proceed to step S68. In step S67, a value obtained by adding the value $(\omega 2-\omega 1)/n$ to the detected rotation speed $\omega 1$ may be set as the control rotation speed $\omega$. In step S68, a value obtained by adding the variation threshold value c to the detected rotation speed $\omega 1$ may be set as the control rotation speed $\omega$. In step S69, the estimated rotation speed $\omega 2$ may be set as the control rotation speed $\omega$.

That is, in switching the rotation speed $\omega$ from the detected rotation speed $\omega 1$ to the estimated rotation speed $\omega 2$, the switcher 108 may reduce an amount of variation for each cycle in the control rotation speed $\omega$ to a value equal to or smaller than the variation threshold c. In one specific but non-limiting example, in the case where magnitude of a rotation speed difference between the detected rotation speed $\omega 1$ and the estimated rotation speed $\omega 2$ is equal to or smaller than the variation threshold c, the switcher 108 may immediately switch from the detected rotation speed $\omega 1$ to the estimated rotation speed $\omega 2$ (steps S61→S65→S69). In the case where the rotation speed difference between the pre-switching detected rotation speed $\omega 1$ and the post-switching estimated rotation speed $\omega 2$ is greater than the variation threshold c, the switcher 108 may gradually decrease the rotation speed difference by dividing it by the predetermined number of times n, to reduce the amount of variation for each cycle in the control rotation speed $\omega$ at the time of the switching to a value smaller than the variation threshold c (steps S61→S62→S63, and steps S65→S66→S67). In a case where the value obtained by dividing the rotation speed difference by the number of times n is equal to or greater than the variation threshold c, the switcher 108 may gradually decrease the rotation speed difference by the variation threshold c, to reduce the amount of variation for each cycle in the control rotation speed $\omega$ at the time of the switching to the variation threshold c (steps S61→S62→S64, and steps S65→S66→S68). It is to be noted that the variation threshold c in steps S61 and S65 may be a value different from the variation threshold c in, for example, steps S62 and S66. The switcher 108 may use the same procedure as that of FIG. 5 in switching from the estimated rotation speed $\omega 2$ to the detected rotation speed $\omega 1$ in step S5 of FIG. 4. Moreover, in steps S5 and S6 of FIG. 4, the switcher 108 may use the same procedure as that of FIG. 5 in switching the rotation position $\theta$ between the detected rotation position $\theta 1$ and the estimated rotation position $\theta 2$.

[Workings and Effects]

Described next are workings and effects. The motor ECU 1 may be able to execute a motor control (hereinafter referred to as a first control) using the rotation position $\theta 1$ detected by the R/D converter 14 and a motor control (hereinafter referred to as a second control) using the rotation position $\theta 2$ estimated by the rotation position estimator 106 (microcomputer 10). The rotation position $\theta 1$ is the rotation position detected using the signals from the resolver 30. The rotation position $\theta 2$ is the rotation position estimated using the currents of the motor 3. The motor ECU 1 is able to switch between the first control and the second control to execute the first control or the second control, by switching between the detected rotation position $\theta 1$ and the estimated rotation position $\theta 2$ to use the detected rotation position $\theta 1$ or the estimated rotation position $\theta 2$. This makes it possible to enhance fail-safe performance because in a case where the R/D converter 14 or the rotation position estimator 106 fails, it is possible to use the remaining one. Even in a case where neither the R/D converter 14 nor the rotation position estimator 106 fails, it is possible to realize high accuracy or responsiveness of the motor control as a whole, by switching between the first control and the second control so as to cover weakness of the first control and the second control.

That is, the weakness of the first control include, for example, the following points (A) and (B).

(A) In the region where the rotation speed $\omega$ of the rotor is high ($\omega$>A1), the resolution of the detected rotation position $\theta 1$ lowers, causing possibility that the detection accuracy X12 of the detected rotation position $\theta 1$ (and the detected rotation speed oil) may become lower than the requested accuracy X0. It is to be noted that in order to prevent the detection accuracy from becoming lower than the requested accuracy X0, the predetermined value A1 may be raised. The predetermined value A1 corresponds to the upper limit A1 of the rotation speed $\omega$ at which the resolution of the detected rotation position $\theta 1$ is kept high. However, this may cause an increase in costs of the R/D converter 14.

(B) The signals from the resolver 30 may contain a noise via the signal line 22 that couples together the resolver 30 and the motor ECU 1. In particular, the noise is likely to be introduced in a case where the signal line 22 is extended close to the motor 3, or is disposed parallel to the power supply line 20 or the electric wire 21, or the signal line 22 is relatively long.

The weakness of the second control include, for example, the following points (C) and (D).

(C) In the region where the rotation speed $\omega$ of the rotor is low ($\omega$<A2), the estimation accuracy X2 of the estimated rotation position $\theta 2$ (and the estimated rotation speed $\omega 2$) may become lower than the requested accuracy X0.

(D) The estimation processing of the rotation position θ2 (and the rotation speed ω2) is necessary in a feedback control, causing low responsiveness to changes in the command values Tr* and ω*.

That is, as to the first control, the resolution of the detected rotation position θ1 using the signals from the resolver 30 is higher in the region where the rotation speed ω is equal to or lower than the first predetermined value A1, than in the region where the rotation speed ω is greater than the first predetermined value A1. However, with the noise included in the signals from the resolver 30, there is possibility that the detection accuracy X11 of, for example, the detected rotation position θ1 may lower. Meanwhile, as to the second control, the current signals are less likely to include the noise because, for example, the currents iu, iv, iw of the motor 3 are detectable inside the motor ECU 1. Estimating, for example, the estimated rotation position θ2 using the current signals hardly causes possibility that the estimation accuracy X2 of, for example, the estimated rotation position θ2 lowers due to the noise. In the second control, however, the responsiveness to the changes in the command values Tr* and ω* is lower than that in the first control. Moreover, in the second control, in the region where the rotation speed ω is lower than the second predetermined value A2, there is possibility that the estimation accuracy X2 of, for example, the estimated rotation position θ2 may become lower than the requested accuracy X0.

The motor ECU 1 may, therefore, basically execute the first control in the region where the rotation speed ω of the rotor is equal to or lower than the first predetermined value A1. This allows the detection accuracy X11 using the resolver 30 to be equal to or higher than the requested accuracy X0, making it possible to attain enhanced accuracy of the motor control. For example, in the case where the rotation speed ω is lower than the second predetermined value A2 (A2<A1), the motor ECU 1 may execute the first control while inhibiting the second control (steps S2→S5 in FIG. 4). In this case, the execution of the second control based on the estimation accuracy X2 lower than the requested accuracy X0 is avoided, making it possible to provide the enhanced accuracy of the motor control. Meanwhile, even in the region where the rotation speed ω is equal to or smaller than the first predetermined value A1, the motor ECU 1 may switch the first control and the second control to execute the first control or the second control depending on the situation, instead of univocally executing the first control. This makes it possible to enhance the accuracy or the responsiveness of the motor control as a whole.

For example, in the region where the rotation speed ω of the rotor is equal to or lower than the first predetermined value A1, the motor ECU 1 may determine the magnitude of the influence of the noise in the signals from the resolver 30 on the accuracy of the detection by the R/D converter 14. In a case where the magnitude of the influence is equal to or greater than the predetermined threshold D, the motor ECU 1 may execute the second control while inhibiting the first control (steps S3→S6 in FIG. 4). In a case where the first control is being executed, the motor ECU 1 may switch to the second control. In a case where the second control is being executed, the motor ECU 1 may continue the second control. In this case, using, in the motor control, the estimated rotation position θ2 that is less affected by the noise makes it possible to provide the enhanced accuracy of the motor control. Moreover, it becomes less necessary to provide the R/D converter 14 with, for example, a filter that removes the noise. This leads to a more simplified configuration of the R/D converter 14. In addition, it becomes less necessary to provide the signal line 22 with, for example, a shield as a countermeasure against the noise. This leads to a higher degree of freedom in an arrangement and/or a length of the signal line 22.

Meanwhile, in the case with possibility of low responsiveness of the second control, the motor ECU 1 may execute the first control while inhibiting the second control. For example, the motor ECU 1 may execute the first control while inhibiting the second control, in the case where the amount of change per time ΔTr* in the torque Tr* of the motor 3 is equal to or greater than the threshold B (steps S4→S5 in FIG. 4). In the case where the second control is being executed, the motor ECU 1 may switch to the first control. In the case where the first control is being executed, the motor ECU 1 may continue the first control. In this case, in the case where the torque of the motor 3 as a control target changes, inhibiting the second control having low responsiveness to the change, while executing the first control having high responsiveness, makes it possible to ensure the responsiveness of the motor control. Determining whether or not the amount of change per time ΔTr* is equal to or greater than the threshold B makes it possible to determine the change in the torque of the motor 3 as the control target.

It is to be noted that the use of the amount of change ΔTr* in the command value Tr* of the motor torque is non-limiting. The determination as to the change in the torque may be made, with the use of an amount of change ΔTr in the detected value Tr by, for example, a sensor. In the case with the use of the amount of change ΔTr* in the command value Tr*, it is unnecessary to detect an actual torque value, making it possible to determine the change in the torque more quickly. Moreover, the use of the amount of change in the torque itself of the motor 3 is non-limiting. The determination as to the change in the torque may be made, with the use of an amount of change per time in a parameter related to the torque of the motor 3. For example, the rotational acceleration rate or a current of the motor 3 may be used as the parameter. Note that the concept of an acceleration rate includes a deceleration rate, and the same shall apply hereinafter. The parameter as mentioned above may be a value detected by, for example, a sensor, an estimated value obtained by calculation, or a command value.

The motor ECU 1 may also execute the first control while inhibiting the second control, in the case where the amount of change per time ΔTr* in the torque Tr* of the motor 3 is smaller than the threshold B. Meanwhile, the motor ECU 1 according to this embodiment may execute the second control while inhibiting the first control, in the case where the amount of change per time ΔTr* in the torque Tr* of the motor 3 is smaller than the threshold B (steps S4→S6 in FIG. 4). Thus, in the case where the change in the torque of the motor 3 as the control target is small, i.e., in a case where the responsiveness to the change is barely requested and the weakness of the second control are less significant, executing the second control makes it possible to cover the weakness of the first control. It is to be noted that in step S4 of FIG. 4, even in the case where the amount of change per time Δω in the rotation speed ω of the motor 3 is equal to or greater than the threshold C, if the amount of change per time ΔTr* in the torque of the motor 3 is smaller than the threshold B, the process may be shifted to step S6.

In addition, for example, the motor ECU 1 may execute the first control while inhibiting the second control, in the case where the amount of change per time Δω in the rotation speed ω of the motor 3 is equal to or greater than the threshold C (steps S4→S5 in FIG. 4). Thus, in the case where the rotation speed ω of the motor 3 as the control target changes, inhibiting the second control having the low responsiveness to this change, while executing the first control having the high responsiveness, makes it possible to ensure the responsiveness of the motor control. Determining whether or not the amount of change per time Δω in the rotation speed ω is equal to or greater than the threshold C makes it possible to determine the change in the rotation speed ω of the motor 3 as the control target.

It is to be noted that the use of the amount of change in the detected rotation speed ω1 or the estimated rotation speed ω2 is non-limiting. The motor ECU 1 may determine the change in the rotation speed ω with the use of the amount of change Δω* in the command value ω* of the rotation speed. The use of the amount of change Δω* in the command value makes it unnecessary to detect or estimate the actual rotation speed ω. Hence, it is possible to determine the change in the rotation speed ω more quickly. Further, the use of the amount of change in the rotation speed ω itself of the motor 3 is non-limiting. The motor ECU 1 may determine the change in the rotation speed ω, with the use of the amount of change per time in the parameter related to the rotation speed ω. For example, the rotational acceleration rate or a voltage of the motor 3 may be used as the parameter as mentioned above. The parameter may be a value detected by, for example, a sensor, an estimated value obtained by calculation, or a command value.

The motor ECU 1 may also execute the first control while inhibiting the second control, in the case where the amount of change per time Δω in the rotation speed ω of the motor 3 is smaller than the threshold C. Meanwhile, the motor ECU 1 according to this embodiment may execute the second control while inhibiting the first control, in the case where the amount of change per time Δω in the rotation speed ω of the motor 3 is smaller than the threshold C (steps S4→S6 in FIG. 4). Thus, in the case where the change in the rotation speed ω of the motor 3 as the control target is small, i.e., in the case where the responsiveness to the change is barely requested and the weakness of the second control are less significant, executing the second control makes it possible to cover the weakness of the first control. It is to be noted that in step S4 of FIG. 4, even in the case where the amount of change per time ΔTr* in the torque of the motor 3 is equal to or greater than the threshold B, if the amount of change per time Δω in the rotation speed ω of the motor 3 is smaller than the threshold C, the process may be shifted to step S6.

The motor 3 is directed to vehicle driving. The amount of change per time ΔTr* in the torque of the motor 3 may correspond to an amount of change per time in a vehicle driving force to be requested in a vehicle control. Accordingly, executing the first control while inhibiting the second control in the case where the amount of change ΔTr* is equal to or greater than the threshold B contributes to enhanced responsiveness of a vehicle driving force control by ensuring the responsiveness of the motor control. Further, for example, in a hybrid electric vehicle, in a case of a control of the torque of the motor 3 in cooperation with output torque of an engine, controlling the change in the torque of the motor 3 with high accuracy makes it possible to enhance fuel consumption or exhaust performance of the engine. From this viewpoint, in step S4 of FIG. 4, instead of the amount of change per time ΔTr* in the torque of the motor 3, an amount of change per time in a parameter (other than the motor torque) related to the vehicle driving force requested in the vehicle control may be used for the determination. The parameter as mentioned above may include, for example but not limited to, torque of a drive shaft of the vehicle, a vehicle acceleration rate, an amount of accelerator operation, and an amount of brake operation. These may be detected values, estimated values by calculation, or command values. Moreover, the motor ECU 1 may execute the first control while inhibiting the second control, in a case where magnitude of the parameter as mentioned above is equal to or greater than a threshold, instead of the amount of change per time in the parameter related to the vehicle driving force (including the motor torque). One reason is as follows. In a case where the vehicle driving force is great, controlling the change in the torque of the motor 3 with high accuracy produces great effects on, for example, fuel consumption.

Moreover, the amount of change per time Δω in the rotation speed ω of the motor 3 may correspond to an amount of change per time of the vehicle speed Vsp, i.e., the vehicle acceleration rate, that is requested in the vehicle control. Accordingly, executing the first control while inhibiting the second control in the case where the amount of change Δω is equal to or greater than the threshold C contributes to the enhanced responsiveness of a vehicle speed control by ensuring the responsiveness of the motor control. From this viewpoint, in step S4 of FIG. 4, instead of the amount of change per time Δω in the rotation speed ω of the motor 3, an amount of change per time in a parameter (other than the rotation speed ω of the motor) related to the vehicle speed Vsp requested in the vehicle control may be used for the determination. The parameter as mentioned above may include, for example but not limited to, the rotation speed ω of the drive shaft of the vehicle, i.e., the vehicle speed Vsp, and a wheel speed. These may be detected values, estimated values by calculation, or command values.

In a case where the cruise control is being executed that includes maintaining the vehicle speed Vsp within a predetermined range, the amount of change per time in the vehicle speed Vsp requested in the control is small. It may be, therefore, determined that the amount of change per time Δω in the rotation speed ω of the motor 3 is small. Accordingly, in the case where the cruise control is being executed, the motor ECU 1 may execute the second control while inhibiting the first control. For example, in step S4 of FIG. 4, instead of determining the amount of change Δu), a determination may be made as to whether or not the cruise control is being executed. In a case where a determination is made that the cruise control is being executed, the process may shift to step S6.

It is to be noted that it suffices for the method of estimating the rotation position θ2 of the rotor without using the signals from the resolver 30 to use the currents of the motor 3. Non-limiting examples may include to superimpose a pulse signal for position estimation on the command voltage and to detect a current response to estimate the rotation position θ2. In contrast, the motor ECU 1 (microcomputer 10) according to this embodiment may estimate the rotation position θ2 of the rotor on the basis of the induced electromotive force of the motor 3 generated by the rotation of the rotor. Accordingly, in a case where a circuit that detects the induced electromotive force (rotation position estimator 106 or rotation speed estimator 107) has a time constant (filter), the responsiveness to the changes in the command values Tr* and ω* becomes low. Thus, switching to the first control makes it possible to effectively compensate the deterioration in the responsiveness of the motor control. Moreover, in the case where the rotation speed ω of the rotor is low, there is high possibility of deterioration in the accuracy in estimating the rotation position θ2 using the induced electromotive force. In contrast, the motor ECU 1 may execute the first control while inhibiting the second control in the region in which the rotation speed ω is lower than the second predetermined value A2 (steps S2→S5 in FIG. 4). Hence, it is possible to enhance the accuracy of the motor control.

The motor ECU 1 may execute the second control while inhibiting the first control in the region in which the rotation speed ω is higher than the first predetermined value A1 (steps S1→S6 in FIG. 4). In the case where the first control is being executed, the motor ECU 1 may switch to the second control. In a case where the second control is being executed, the motor ECU 1 may continue the second control. In this case, even in a case where the resolution of the detected rotation position θ1 using the signals from the resolver 30 lowers, executing the second control using the estimated rotation position θ2 makes it possible to continue the motor control with a certain degree of accuracy. In particular, this is effective in a case where the detection accuracy X12 of the detected rotation position θ1 is lower than the estimation accuracy X2 of the estimated rotation position θ2 in the region where the rotation speed ω is higher than the first predetermined value A1. It is to be noted that even in the region where the rotation speed ω is higher than the first predetermined value A1, that is, even in the case where the resolution of the detected rotation position θ1 is low, the motor ECU 1 may switch between the first control and the second control in accordance with circumstances, to execute whichever of the first control and the second control the switching is made to, as in the region where the rotation speed ω is equal to or lower than the first predetermined value A1, instead of univocally executing the second control.

In switching between the first control and the second control, the motor ECU 1 may gradually change the rotation position θ used in controlling the motor 3 from the pre-switching value to the post-switching value. This suppresses the rotation position θ to be used in the motor control from changing abruptly in accompaniment with the switching between the first control and the second control. Hence, it is possible to suppress instability of the motor control. It is to be noted that in step S1 of FIG. 4, the motor ECU 1 may allow the first predetermined value A1 in determining that the rotation speed ω has shifted from the region in which the rotation speed ω is higher than the first predetermined value A1 to the region in which the rotation speed ω is equal to or lower than the first predetermined value A1, and the first predetermined value A1 in determining that the rotation speed ω has shifted from the region in which the rotation speed ω is equal to or lower than the first predetermined value A1 to the region in which the rotation speed ω is higher than the first predetermined value A1 to take different values from each other. This makes it possible to suppress frequent switching between the first control and the second control, i.e., hunting of the control. The same applies to the second predetermined value A2 in step S2 or the thresholds B and C in step S4.

2. Second Embodiment

Figure 6:
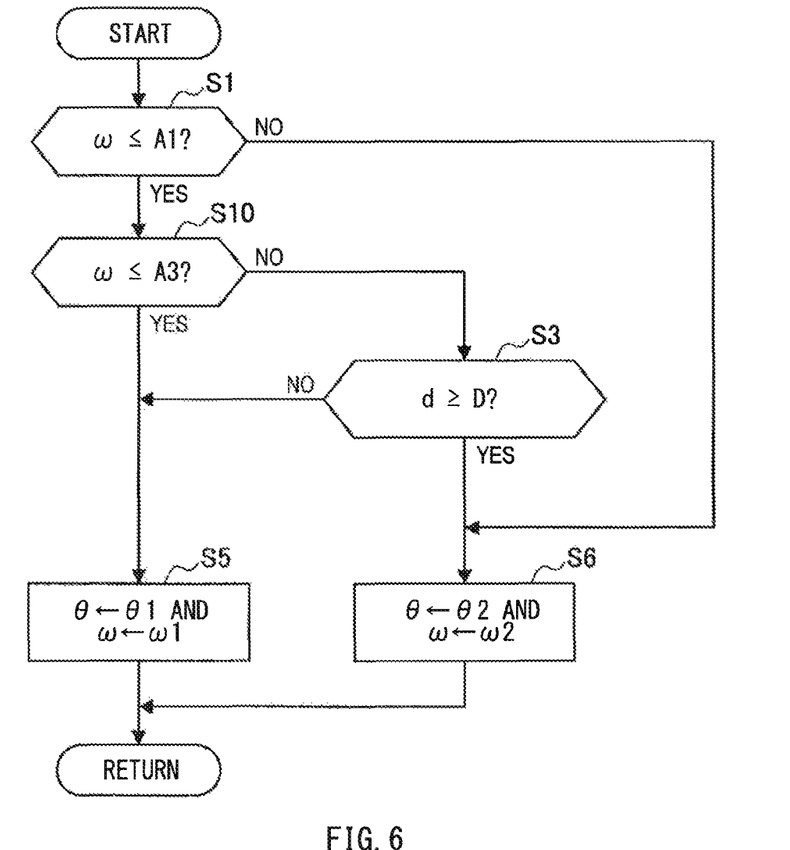
FIG. 6 is a flowchart of switching processing by a motor control apparatus according to a second embodiment of the technology.

Described next, with reference to FIG. 6, is a motor control apparatus according to a second embodiment of the technology. Description is given, first, solely of a configuration different from that of the first embodiment (FIG. 4), and a configuration common to that of the first embodiment is denoted by the same reference numerals, and a description thereof is omitted.

FIG. 6 illustrates an example of a flow of processing to be executed by the switcher 108. This flow differs from the first embodiment in that it does not have steps S2 and S4 in FIG. 4, but instead has step S10. In the case with the affirmative determination in step S1 (YES in step S1), the process may proceed to step S10. In step S10, a determination may be made as to whether or not the rotation speed ω outputted on the previous cycle is equal to or lower than the third predetermined value A3. As illustrated in FIG. 2, the third predetermined value A3 may be higher than the second predetermined value A2 and lower than the first predetermined value A1 (A2<A3<A1). The third predetermined value A3 may be a value corresponding to an upper limit of a vehicle speed range in which the amount of change per time in the vehicle driving force requested in the vehicle control becomes greater than the responsiveness of the second control. The third predetermined value A3 may be set in advance by, for example, experiments. In a case where the rotation speed ω is equal to or lower than the third predetermined value A3 (YES in step S10), the process may proceed to step S5. In a case where the rotation speed ω is higher than the third predetermined value A3 (NO in step S10), the process may proceed to step S3. It is to be noted that in place of the rotation speed ω, the command rotation speed ω* may be used. In step S3, in the case where the degree of the influence of the noise in the output signals of the resolver 30 is smaller than the threshold D (NO in step S3), the process may proceed to step S5.

In switching the combination of the values (θ, ω) of the rotation position θ and the rotation speed ω between (θ1, ω1) and (θ2, ω), in a case where the rotation speed ω falls within a predetermined range including the third predetermined value A3, the switcher 108 may change the combination of the values (θ, ω) from the pre-switching values to the post-switching values earlier in a case where the rotational acceleration rate in a direction toward the third predetermined value A3 is greater than a predetermined threshold, than in a case where the rotational acceleration rate is smaller than the predetermined threshold. For example, in the case where the rotation speed ω falls within the predetermined range including the third predetermined value A3, if the rotational acceleration rate in the direction toward the third predetermined value A3 is equal to or greater than the predetermined threshold, changing the third predetermined value A3 so as to bring the third predetermined value A3 closer to the current rotation speed ω makes it possible to advance start timing of the switching.

Description is given next of workings and effects. In the case where the rotation speed ω of the rotor is equal to or lower than the third predetermined value A3, the motor ECU 1 may execute the first control while inhibiting the second control. Thus, in the case where the rotation speed ω is equal to or lower than the third predetermined value A3, the vehicle speed Vsp is low. It may be, therefore, determined that the amount of change per time in the vehicle driving force requested in the vehicle control is great, that is, the responsiveness requested for the control of the motor 3 is higher than the responsiveness of the second control. In such a case, executing the first control to detect the rotation position at higher responsiveness to the change in the requested driving force makes it possible to accurately control the torque of the motor 3, i.e., the driving force of the vehicle. It is to be noted that setting the third predetermined value A3 to a higher value than the second predetermined value A2 produces, in a case where the process proceeds from step S10 to step S5, similar workings and effects to those in the first embodiment in the case where the process proceeds from step S2 to step S5.

In the case where the rotation speed ω falls in the predetermined range including the third predetermined value A3, the motor ECU 1 may switch between the first control and the second control earlier in the case where the rotational acceleration rate in the direction toward the third predetermined value A3 is greater than the predetermined threshold, than in the case where the rotational acceleration rate is smaller than the predetermined threshold. In other words, there is higher possibility that the rotation speed ω changes across the third predetermined value A3 in the case where the rotational acceleration rate in the direction toward the third predetermined value A3 is greater than the predetermined threshold, than in the case where the rotational acceleration rate is smaller than the predetermined threshold. In such a case, switching between the first control and the second control at earlier timing makes it possible to realize quicker and more accurate switching. For example, in the case where the rotational acceleration rate in the direction toward the third predetermined value A3 is equal to or greater than the predetermined threshold, the third predetermined value A3 may be changed so as to bring the third predetermined value A3 closer to the current rotation speed ω. In this case, it is possible to change the timing as mentioned above by a simple configuration in which the third predetermined value A3 as a threshold of the switching between the first control and the second control is changed.

It is to be noted that in step S10 of FIG. 6, the motor ECU 1 may allow the third predetermined value A3 in determining that the rotation speed ω has shifted from the region in which the rotation speed ω is higher than the third predetermined value A3 to the region in which the rotation speed ω is equal to or lower than the third predetermined value A3, and the third predetermined value A3 in determining that the rotation speed ω has shifted from the region in which the rotation speed ω is equal to or lower than the third predetermined value A3 to the region in which the rotation speed ω is higher than the third predetermined value A3 to take different values from each other. This makes it possible to suppress the hunting of the control. Moreover, the motor ECU 1 may have a similar configuration with respect to the second predetermined value A2 to that of the third predetermined value A3. That is, in a case where the rotation speed ω falls within a predetermined range including the second predetermined value A2, the motor ECU 1 may switch between the first control and the second control earlier in a case where the rotational acceleration rate in a direction toward the second predetermined value A2 is greater than a threshold, than in a case where the rotational acceleration rate is smaller than the threshold. Furthermore, the motor ECU 1 may advance the switch timing between the first control and the second control, solely in a case where the rotational acceleration rate is greater than the threshold at which the rotation speed ω changes toward the third predetermined value A3 from the region in which the rotation speed ω is higher than the third predetermined value A3, while keeping from advancing the switch timing between the first control and the second control in a case where the rotational acceleration rate is greater than the threshold at which the rotation speed ω changes toward the third predetermined value A3 from the region in which the rotation speed ω is lower than the third predetermined value A3. In the case where the rotational acceleration is greater than the threshold as mentioned above, there is possibility of a request for high responsiveness to the change in the rotation speed ω. Accordingly, giving priority to the execution of the first control makes it possible to enhance the responsiveness of the motor control.

In the case where the cruise control is being executed that includes maintaining the vehicle speed Vsp within the predetermined range, the amount of change per time in the vehicle driving force requested in the vehicle control is small. It may be, therefore, determined that the responsiveness requested for the control of the motor 3 is low. Accordingly, in the case where the cruise control is being executed, the motor ECU 1 may execute the second control while inhibiting the first control. For example, step S11 may be provided on the way to step S3, in the case with the negative determination in step S10 of FIG. 6. In step S11, a determination may be made as to whether or not the cruise control is being executed. In a case where a determination is made that the cruise control is not being executed (NO in step S11), the process may proceed to step S3. In a case where a determination is made that the cruise control is being executed (YES in step S11), the process may proceed to step S6.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, the motor is not limited to a synchronous motor, but may be, for example, an induction motor. In short, it suffices to be a rotating electric machine including a rotor and a resolver. The application of the motor is not limited to a vehicle, and may be, for example, a home appliance.

The control method of the voltage to be outputted from the inverter to the motor is not limited to the PWM control. The voltage to be outputted from the inverter to the motor may be controlled using a PAM (Pulse Amplitude Modulation) control. The voltage to be outputted from the inverter to the motor is not limited to a sine wave, and may be a rectangular wave or a trapezoidal wave. That is, the motor is not limited to a brushless AC motor, and may be a brushless DC motor.

The method by which the motor control apparatus controls the motor using the detected or estimated rotation position is not limited to a vector control. Using the vector control as in the forgoing example embodiments makes it possible to efficiently control the torque of the motor.

The motor control apparatus may estimate the currents to be used in the sensorless control, i.e., the second control, without directly detecting the currents by the current sensor. For example, a DC bus current of an inverter may be detected by, for example, a shunt resistance, and the currents of the motor may be estimated and calculated.

According to the aspects of the technology, it is possible to provide a motor control apparatus and a motor control method that switch between a first control and a second control, making it possible to achieve high accuracy or responsiveness, or both, of a motor control as a whole.

The motor ECU 1 or the microcomputer 10 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the motor ECU 1 or the microcomputer 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the motor ECU 1 or the microcomputer 10 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A motor control apparatus that controls a motor including a rotor and a resolver, the motor control apparatus comprising:
    a first detector configured to detect a rotation position of the rotor using a signal from the resolver, the first detector allowing resolution of the rotation position to become lower in a region in which a rotation speed of the rotor is higher than a first predetermined value, than in a region in which the rotation speed is equal to or lower than the first predetermined value;
    a second detector configured to estimate the rotation position of the rotor using a current of the motor without using the signal from the resolver; and
    a switcher configured to switch between a first control and a second control in the region in which the rotation speed is equal to or lower than the first predetermined value, the first control including controlling the motor using the rotation position detected by the first detector, and the second control including controlling the motor using the rotation position estimated by the second detector,
    wherein an accuracy of an estimation of the rotation position by the second detector is lower than a predetermined requested accuracy in a region in which the rotation speed of the rotor is lower than a second predetermined value lower than the first predetermined value, and
    wherein the switcher executes the first control while inhibiting the second control on a condition that the rotation speed of the rotor is lower than the second predetermined value.

2. The motor control apparatus according to claim 1, wherein in switching between the first control and the second control, the switcher allows the rotation position for use in controlling the motor to change gradually from a pre-switching value to a post-switching value.

3. The motor control apparatus according to claim 2, wherein the switcher determines magnitude of influence of a noise in the signal from the resolver on accuracy of detection of the rotation position by the first detector, and
    wherein the switcher executes the second control while inhibiting the first control on a condition that the magnitude of the influence is equal to or greater than a threshold.

4. The motor control apparatus according to claim 2, wherein the switcher executes the first control while inhibiting the second control on a condition that an amount of change per time in torque of the motor or an amount of change per time in the rotation speed, or an amount of change per time in a parameter related to the torque or an amount of change per time in a parameter related to the rotation speed is equal to or greater than a threshold.

5. The motor control apparatus according to claim 2, wherein an accuracy of an estimation of the rotation position by the second detector is lower than predetermined requested accuracy in a region in which the rotation speed of the rotor is lower than a second predetermined value lower than the first predetermined value, and
    wherein the switcher executes the first control while inhibiting the second control on a condition that the rotation speed of the rotor is lower than a third predetermined value, the third predetermined value being lower than the first predetermined value and higher than the second predetermined value.

6. The motor control apparatus according to claim 2, wherein the switcher switches between the first control and the second control on a condition that the rotation speed of the rotor changes across a predetermined value, and
    wherein the switcher switches, on a condition that the rotation speed of the rotor falls within a predetermined range including the predetermined value, between the first control and the second control earlier in a case where a rotational acceleration rate of the rotor toward the predetermined value is greater than a threshold, than in a case where the rotational acceleration rate is smaller than the threshold.

7. The motor control apparatus according to claim 1, wherein the switcher determines magnitude of influence of a noise in the signal from the resolver on accuracy of detection of the rotation position by the first detector, and
    wherein the switcher executes the second control while inhibiting the first control on a condition that the magnitude of the influence is equal to or greater than a threshold.

8. The motor control apparatus according to claim 1, wherein the switcher executes the first control while inhibiting the second control on a condition that an amount of change per time in torque of the motor or an amount of change per time in the rotation speed, or an amount of change per time in a parameter related to the torque or an amount of change per time in a parameter related to the rotation speed is equal to or greater than a threshold.

9. A motor control apparatus that controls a motor including a rotor and a resolver, the motor control apparatus comprising:
    a first detector configured to detect a rotation position of the rotor using a signal from the resolver, the first detector allowing resolution of the rotation position to become lower in a region in which a rotation speed of the rotor is higher than a first predetermined value, than in a region in which the rotation speed is equal to or lower than the first predetermined value;
    a second detector configured to estimate the rotation position of the rotor using a current of the motor without using the signal from the resolver; and
    a switcher configured to switch between a first control and a second control in the region in which the rotation speed is equal to or lower than the first predetermined value, the first control including controlling the motor using the rotation position detected by the first detector, and the second control including controlling the motor using the rotation position estimated by the second detector, wherein an accuracy of an estimation of the rotation position by the second detector is lower than predetermined requested accuracy in a region in which the rotation speed of the rotor is lower than a second predetermined value lower than the first predetermined value, and wherein the switcher executes the first control while inhibiting the second control on a condition that the rotation speed of the rotor is lower than a third predetermined value, the third predetermined value being lower than the first predetermined value and higher than the second predetermined value.

10. A motor control apparatus that controls a motor including a rotor and a resolver, the motor control apparatus comprising:

a first detector configured to detect a rotation position of the rotor using a signal from the resolver, the first detector allowing resolution of the rotation position to become lower in a region in which a rotation speed of the rotor is higher than a first predetermined value, than in a region in which the rotation speed is equal to or lower than the first predetermined value;

a second detector configured to estimate the rotation position of the rotor using a current of the motor without using the signal from the resolver; and a switcher configured to switch between a first control and a second control in the region in which the rotation speed is equal to or lower than the first predetermined value, the first control including controlling the motor using the rotation position detected by the first detector, and the second control including controlling the motor using the rotation position estimated by the second detector, wherein the switcher switches between the first control and the second control on a condition that the rotation speed of the rotor changes across a predetermined value, and wherein the switcher switches, on a condition that the rotation speed of the rotor falls within a predetermined range including the predetermined value, between the first control and the second control earlier in a case where a rotational acceleration rate of the rotor toward the predetermined value is greater than a threshold, than in a case where the rotational acceleration rate is smaller than the threshold.

11. A motor control apparatus that controls a motor, the motor driving a vehicle and including a resolver, the motor control apparatus comprising:

a first detector configured to detect a rotation position of a rotor of the motor using a signal from the resolver;

a second detector configured to estimate the rotation position of the rotor using a current of the motor without using the signal from the resolver; and a switcher configured to execute a first control while inhibiting a second control on a condition that an amount of change per time in a driving force of the vehicle or an amount of change per time in a vehicle speed, or an amount of change per time in a parameter related to the driving force of the vehicle or an amount of change per time in a parameter related to the vehicle speed is equal to or greater than a threshold, the first control including controlling the motor using the rotation position detected by the first detector, and the second control including controlling the motor using the rotation position estimated by the second detector, wherein the switcher executes the second control while inhibiting the first control on a condition that a cruise control is being executed, the cruise control including keeping the vehicle speed within a predetermined range.

* * * * *